(12) United States Patent
DeMaagd et al.

(10) Patent No.: US 11,040,663 B2
(45) Date of Patent: Jun. 22, 2021

(54) PRE-LOADED TWO-LOBE SPRING TWIST-ON REARVIEW MOUNTING ASSEMBLY

(71) Applicant: Gentex Corporation, Zeeland, MI (US)

(72) Inventors: Brian R. DeMaagd, Hudsonville, MI (US); Bradley L. Busscher, Grand Rapids, MI (US)

(73) Assignee: GENTEX CORPORATION, Zeeland, MI (US)

( * ) Notice: Subject to any disclaimer, the term of this patent is extended or adjusted under 35 U.S.C. 154(b) by 130 days.

(21) Appl. No.: 16/213,586

(22) Filed: Dec. 7, 2018

(65) Prior Publication Data

US 2019/0176705 A1    Jun. 13, 2019

Related U.S. Application Data

(60) Provisional application No. 62/596,575, filed on Dec. 8, 2017.

(51) Int. Cl.
*B60R 1/08*       (2006.01)
*F16B 2/24*       (2006.01)
(Continued)

(52) U.S. Cl.
CPC .................. *B60R 1/08* (2013.01); *B60R 1/04* (2013.01); *F16B 1/00* (2013.01); *F16B 2/245* (2013.01);
(Continued)

(58) Field of Classification Search
USPC .... 248/475.1, 476, 477, 478, 479, 485, 486, 248/487, 495, 496; 359/843, 871–877
See application file for complete search history.

(56) References Cited

U.S. PATENT DOCUMENTS 596,207 A    12/1897   Hart
892,105 A     6/1908   White
(Continued)

FOREIGN PATENT DOCUMENTS

EP         0169734 B1    10/1989
JP     2004082829 A     3/2004
(Continued)

OTHER PUBLICATIONS

International Preliminary Report on Patentability, dated Jun. 9, 2020 for corresponding PCT application No. PCT/IB/2018/059792, 7 pages.

*Primary Examiner* — Alfred J Wujciak
(74) *Attorney, Agent, or Firm* — Price Heneveld LLP; Bradley D. Johnson

(57) ABSTRACT

A rearview device attachment assembly includes a mount having a periphery that defines first and second recesses. The mount is configured to engage a windscreen button. An attachment clip is coupled to the mount at a central portion of the attachment clip. The attachment clip includes first and second opposing loading members that abut the first and second recesses. A flex portion extends from each of the first and second opposing loading members. A connection portion extends inwardly from each flex portion. Each of the first and second loading members of the attachment clip is pre-loaded during coupling of the attachment clip to the mount, but prior to rotational engagement of the attachment clip with engagement surfaces of the windscreen button.

14 Claims, 6 Drawing Sheets

(51) Int. Cl.
*B60R 1/04* (2006.01)
*F16B 1/00* (2006.01)
*G02B 7/182* (2021.01)

(52) U.S. Cl.
CPC ...... *G02B 7/182* (2013.01); *F16B 2001/0092* (2013.01)

(56) References Cited

U.S. PATENT DOCUMENTS

| | | | |
|---|---|---|---|
| 1,800,797 A | 4/1931 | Hoople | |
| 4,254,931 A | 3/1981 | Aikens et al. | |
| 4,435,042 A | 3/1984 | Wood et al. | |
| 5,058,851 A | 10/1991 | Lawlor et al. | |
| 5,100,095 A | 3/1992 | Haan et al. | |
| 5,106,177 A | 4/1992 | Dolasia | |
| 5,377,948 A | 1/1995 | Suman et al. | |
| 5,377,949 A | 1/1995 | Haan et al. | |
| 5,487,522 A | 1/1996 | Hook | |
| 5,588,767 A | 12/1996 | Merlo | |
| 5,615,857 A | 4/1997 | Hook | |
| 5,820,097 A | 10/1998 | Spooner | |
| 5,931,440 A | 8/1999 | Miller | |
| 6,250,148 B1 | 6/2001 | Lynam | |
| 6,299,319 B1 | 10/2001 | Mertens et al. | |
| 6,326,613 B1 | 12/2001 | Heslin et al. | |
| 6,326,900 B2 | 12/2001 | DeLine et al. | |
| 6,341,523 B2 | 1/2002 | Lynam | |
| 6,447,127 B1 * | 9/2002 | Yoshida | B60R 1/04 359/871 |
| 6,467,919 B1 | 10/2002 | Rumsey et al. | |
| 6,483,438 B2 | 11/2002 | DeLine et al. | |
| 6,516,664 B2 | 2/2003 | Lynam | |
| 6,843,575 B2 | 1/2005 | Wachi | |
| 6,877,709 B2 | 4/2005 | March et al. | |
| 6,968,736 B2 | 11/2005 | Lynam | |
| 7,025,315 B2 | 4/2006 | Carnevali | |
| 7,156,358 B2 | 1/2007 | March et al. | |
| 7,287,868 B2 | 10/2007 | Carter et al. | |
| 7,296,771 B2 | 11/2007 | Kalis et al. | |
| 7,717,394 B2 | 5/2010 | Tanaka et al. | |
| 7,726,623 B2 | 6/2010 | Müller | |
| 8,134,117 B2 | 3/2012 | Heslin et al. | |
| 8,210,695 B2 | 7/2012 | Roth et al. | |
| 8,226,064 B2 | 7/2012 | Ohashi | |
| 8,309,907 B2 | 11/2012 | Heslin et al. | |
| 8,456,311 B2 | 6/2013 | Wohlfahrt et al. | |
| 8,925,891 B2 | 1/2015 | Van Huis et al. | |
| 8,944,705 B1 | 2/2015 | Matori | |
| 8,960,629 B2 | 2/2015 | Rizk et al. | |
| 9,174,577 B2 | 11/2015 | Busscher et al. | |
| 9,244,249 B2 | 1/2016 | Kim et al. | |
| 9,573,525 B2 * | 2/2017 | Minikey, Jr. | B60R 1/04 |
| 9,682,656 B2 | 6/2017 | Busscher et al. | |
| 10,190,610 B1 * | 1/2019 | Busscher | F16B 5/125 |
| 2004/0207940 A1 | 10/2004 | Carter et al. | |
| 2005/0174663 A1 | 8/2005 | Carter et al. | |
| 2007/0096005 A1 | 5/2007 | March et al. | |
| 2008/0315060 A1 * | 12/2008 | Muller | B60R 1/04 248/475.1 |
| 2011/0168866 A9 | 7/2011 | Gruener et al. | |
| 2013/0062497 A1 | 3/2013 | Van Huis et al. | |
| 2015/0224928 A1 | 8/2015 | Busscher et al. | |
| 2016/0023605 A1 | 1/2016 | Busscher et al. | |
| 2019/0176701 A1 * | 6/2019 | Kremkow | B60R 1/04 |

FOREIGN PATENT DOCUMENTS

JP   2007112206 A   5/2007
SU   1341081 A1   9/1987

* cited by examiner

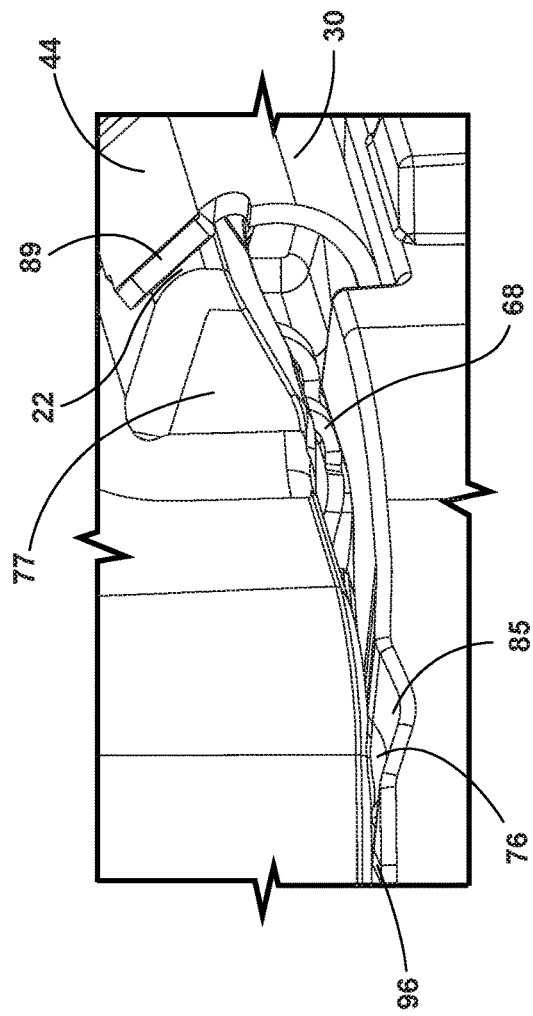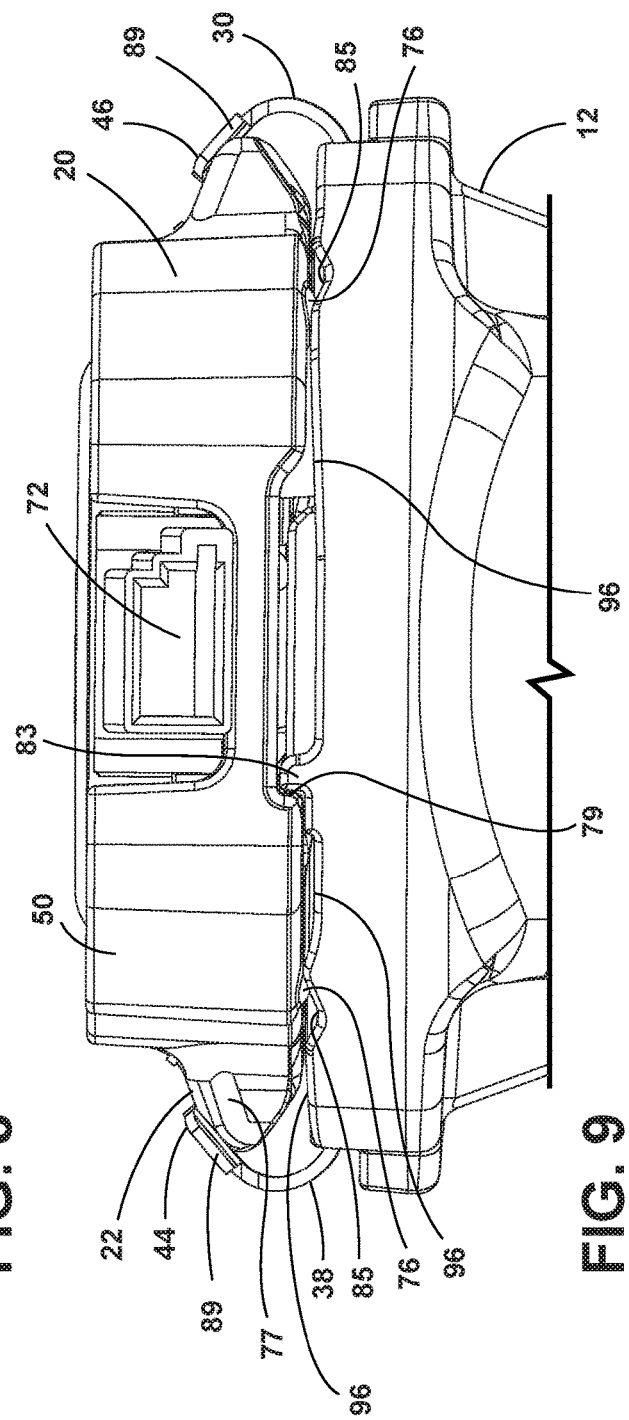

PRE-LOADED TWO-LOBE SPRING TWIST-ON REARVIEW MOUNTING ASSEMBLY

CROSS-REFERENCE TO RELATED APPLICATION

This application claims priority to and the benefit under 35 U.S.C. § 119(e) of U.S. Provisional Application No. 62/596,575, filed on Dec. 8, 2017, entitled "PRE-LOADED TWO-LOBE SPRING TWIST-ON REARVIEW MOUNTING ASSEMBLY," the disclosure of which is hereby incorporated herein by reference in its entirety.

FIELD OF THE DISCLOSURE

The present disclosure generally relates to a rearview mounting assembly, and more particularly to a pre-loaded two-lobe spring twist-on rearview mounting assembly.

SUMMARY OF THE DISCLOSURE

According to one aspect of the present disclosure, a rearview device attachment assembly includes a mount having a periphery that defines first and second recesses. The mount is configured to engage a windscreen button. An attachment clip is coupled to the mount at a central portion of the attachment clip. The attachment clip includes first and second opposing loading members that abut the first and second recesses. A flex portion extends from each of the first and second opposing loading members. A connection portion extends inwardly from each flex portion. Each of the first and second loading members of the attachment clip is pre-loaded during coupling of the attachment clip to the mount, but prior to rotational engagement of the attachment clip with engagement surfaces of the windscreen button.

According to another aspect of the present disclosure, a rearview device attachment assembly includes a mount configured for engagement with a windscreen button. The rearview device attachment assembly also includes an attachment clip coupled to the mount. The attachment clip includes first and second opposing loading members that abut a periphery of the mount. The attachment clip also includes a flex portion extending from each of the first and second opposing loading members and a connection portion extending inwardly from each flex portion. Each of the first and second loading members of the attachment clip is pre-loaded during coupling of the attachment clip to the mount, but prior to engagement of the attachment clip with the windscreen button.

According to yet another aspect of the present disclosure, a method of installing a rearview device includes coupling an attachment clip to a mount. Coupling of the attachment clip results in first and second opposing loading members of the attachment clip being forced away from an engagement area of the mount. A windscreen button is provided that includes first and second engagement surfaces. A sensor is inserted into an opening defined by the windscreen button. A sensor clip is attached to protuberances on the windscreen button. The first and second opposing loading members of the attachment clip are rotated into secure contact with the first and second engagement surfaces of the windscreen button.

These and other features, advantages, and objects of the present disclosure will be further understood and appreciated by those skilled in the art by reference to the following specification, claims, and appended drawings.

BRIEF DESCRIPTION OF THE DRAWINGS

In the drawings:

FIG. 8 is a side elevational view of a portion of a rearview mounting assembly of the present disclosure; and FIG. 9 is a rear elevational view of a rearview mounting assembly of the present disclosure.

DETAILED DESCRIPTION

Figure 1A:
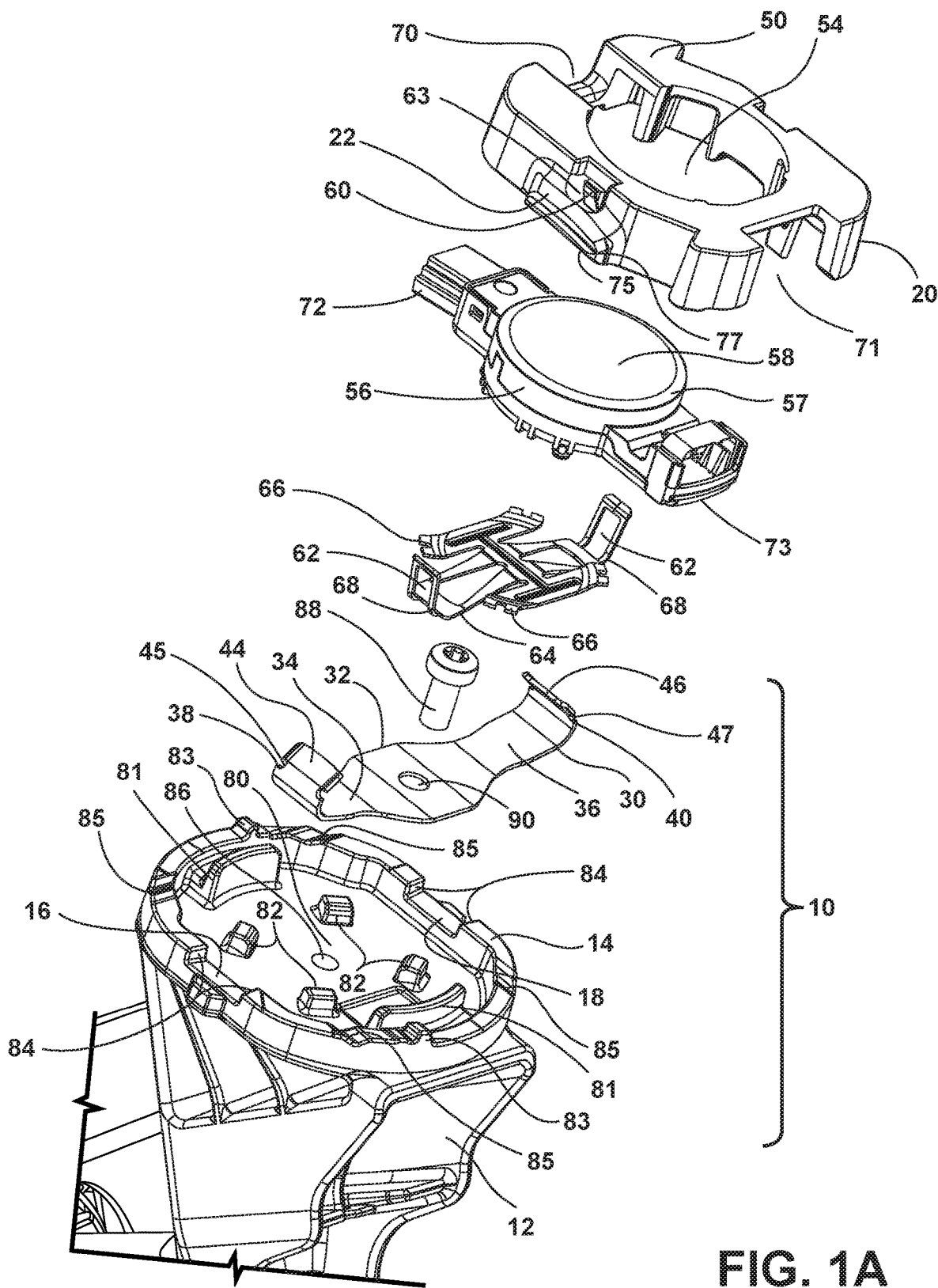
FIG. 1A is a top front perspective exploded view of a rearview mounting assembly of the present disclosure.
Figure 1B:
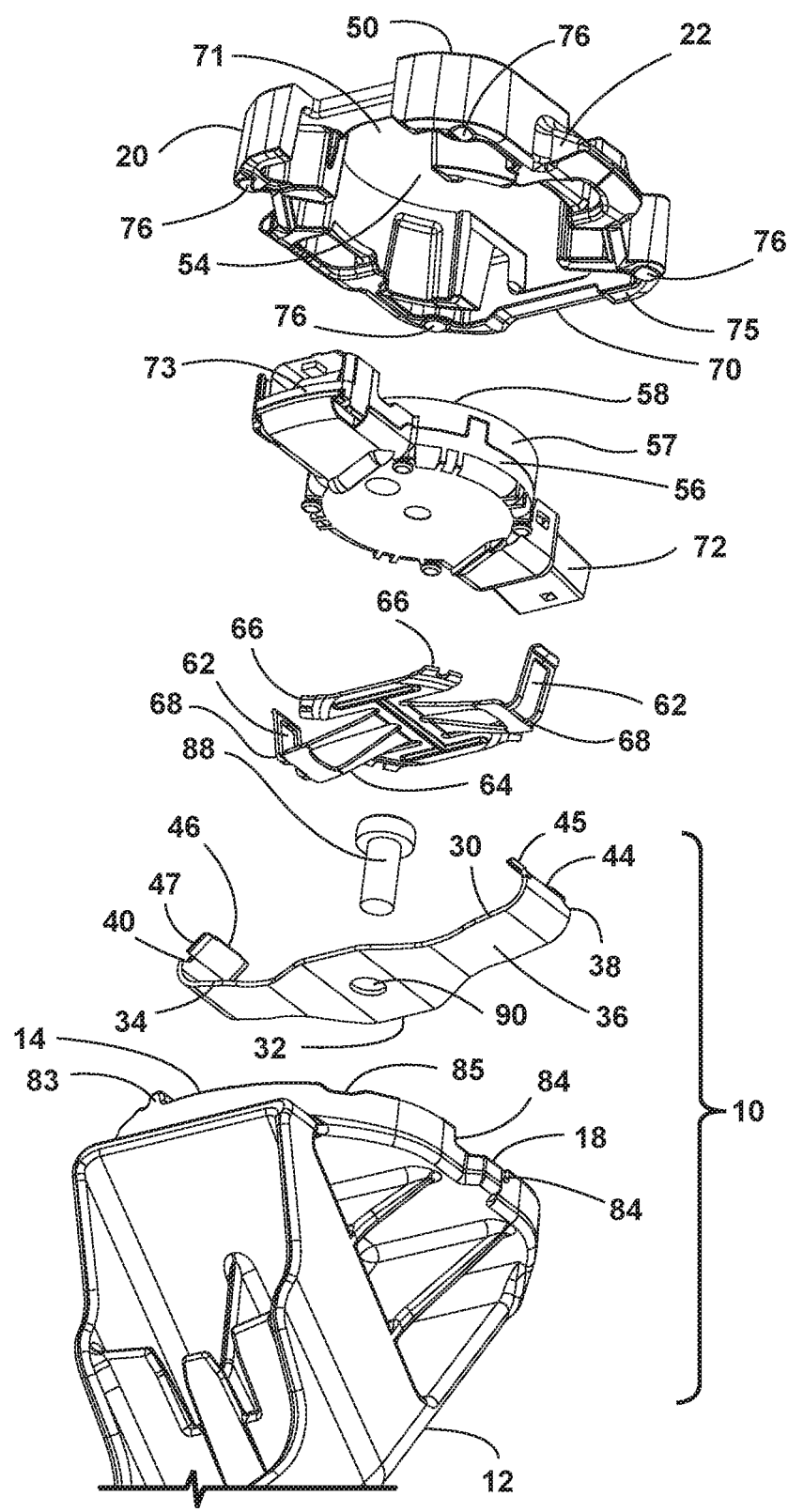
FIG. 1B is a bottom front perspective exploded view of a rearview mounting assembly of the present disclosure.

The present illustrated embodiments reside primarily in combinations of method steps and apparatus components related to a rearview mounting assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof, shall relate to the disclosure as oriented in FIG. 1A. Unless stated otherwise, the term "front" shall refer to the surface of the device closer to an intended viewer of the device, and the term "rear" shall refer to the surface of the device further from the intended viewer of the device. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring to FIGS. 1A-9, reference numeral 10 generally designates a rearview device attachment assembly that includes a mount 12 having a periphery 14 that defines first and second recesses 16, 18. The mount 12 is configured to engage a windscreen button 20. An attachment clip 30 is coupled to the mount 12 at a central portion 32 of the attachment clip 30. The attachment clip 30 includes first and second opposing loading members 34, 36 that abut the first and second recesses 16, 18. Flex portions 38, 40 extend from each of the first and second opposing loading members 34, 36. Connection portions 44, 46 extend inwardly from each flex portion 38, 40, respectively. A narrowed portion 45 is disposed between the flex portion 38 and the connection portion 44. Similarly, a narrowed portion 47 is disposed between the flex portion 40 and the connection portion 46. Each of the first and second opposing loading members 34, 36 of the attachment clip 30 is pre-loaded during coupling of the attachment clip 30 to the mount 12, but prior to rotational engagement of the attachment clip 30 with engagement surfaces 22, 24 of the windscreen button 20.

With reference again to FIGS. 1A and 1B, the rearview device attachment assembly 10 is generally configured for use within a vehicle. However, other applications are also possible. The windscreen button 20 includes a generally planar top surface 50 configured to abut an inside surface of a windscreen of the vehicle. The windscreen button 20 generally defines a central opening 54 configured to receive a sensor 56. The sensor 56 includes a body portion 57 with an engagement face 58 that extends upwardly into the opening 54 defined by the windscreen button 20, such that the engagement face 58 is in abutting contact or close proximity to the windscreen of the vehicle. The engagement face 58 may include a perimeter that is complementary to the opening 54 such that the engagement face 58 is received closely with the opening 54 to minimize buzz, squeak, and rattle. The windscreen button 20 also includes retention features 60 that extend outwardly from the windscreen button 20. There may be a retention feature 60 on each side of the windscreen button 20. The retention features 60 are configured to engage a sensor clip 64. The retention features 60 may be protrusions that extend outwardly from the windscreen button 20, however, other constructions are also possible, such as slots or clips configured for engagement with the sensor clip 64. As illustrated, an opening 63 is located proximate each of the retention features 60. Each opening 63 is configured to receive a flexible attachment portion 68 of the sensor clip 64. Once the flexible attachment portions 68 are inserted into the openings 63, the retention features 60 are retained within apertures 62 defined by the flexible attachment portions 68 of the sensor clip 64. The sensor clip 64 includes retaining members 66 that hold the sensor 56 while the flexible attachment portions 68 engage the retention features 60 on the windscreen button 20 to secure the sensor 56 to the windscreen button 20. Accordingly, the sensor 56, which may be a rain sensor, or any of a variety of other sensors, can be inserted into the opening 54 of the windscreen button 20, such that the body portion 57 of the sensor 56 is secured within the windscreen button 20, and the engagement face 58 is adjacent to or abutting the windscreen of the vehicle.

Figure 3:
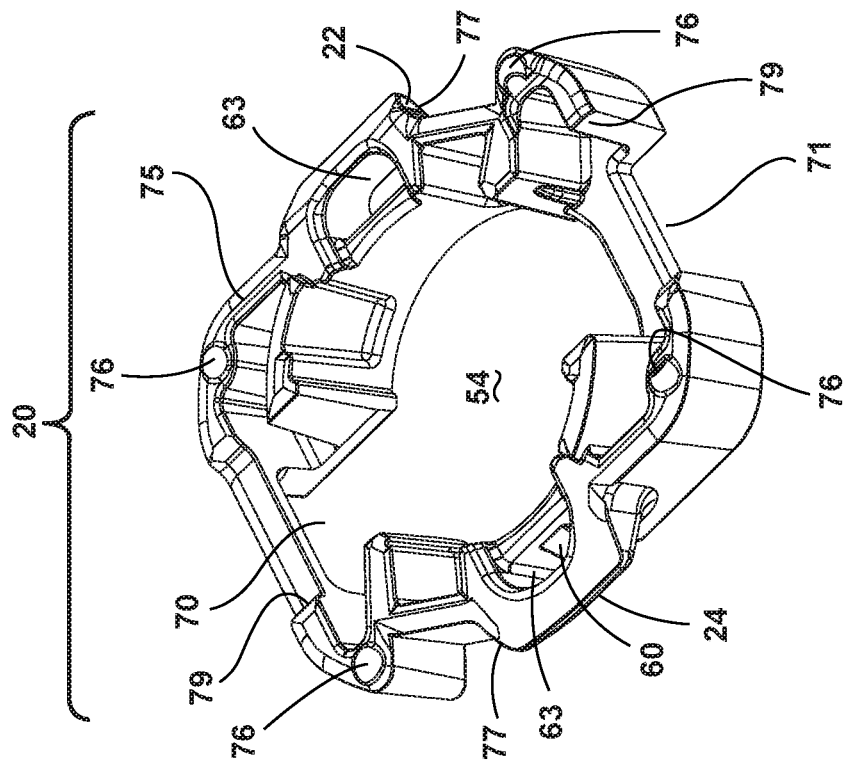
FIG. 3 is a bottom perspective view of the windscreen button of FIG. 2.
Figure 2:
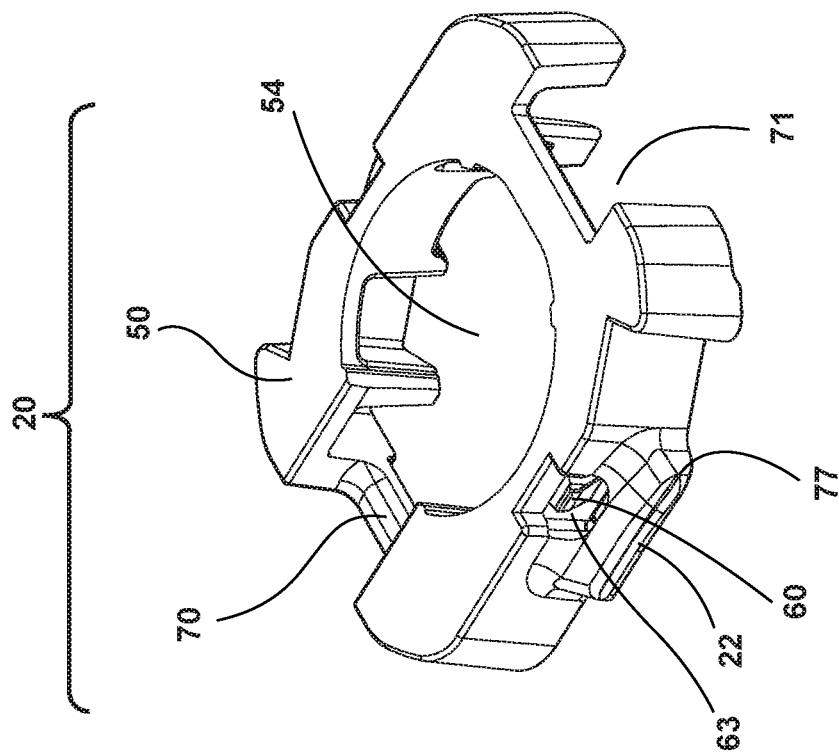
FIG. 2 is a top perspective view of a windscreen button of the present disclosure.

As shown in FIGS. 2 and 3, the windscreen button 20 includes fore and aft openings 70, 71 configured to accommodate power and/or data plugs 72, 73, respectively, extending from the body portion 57. A ramp 77 is disposed on the engagement surface 22. The ramp 77 assists in facilitating engagement of the connection portions 44, 46 with the engagement surfaces 22, 24. More specifically, the ramp 77 facilitates engagement of the connection portion 44 with the engagement surface 22 during rotation of the mount 12 into secure engagement with the windscreen button 20. A similar ramp 77 is disposed on the opposite side of the windscreen button 20 that assists in engagement of the connection portion 46 with the engagement surface 24. An underside 75 of the windscreen button 20 includes locating features 76 disposed at each corner of the windscreen button 20. The locating features 76 are configured to mate with complementary locating troughs 85 of the mount 12. The locating features 76 may be protrusions or bumps that extend from the underside of the windscreen button 20. The locating features 76 may provide sensory feedback, such as tactile or audible feedback, to an installer indicating to the installer that the windscreen button 20 has been fully secured with the mount 12 and restricts fore/aft movement of the rearview device attachment assembly 10. The underside of the windscreen button 20 also includes overtravel stops 79 that are configured to abut ribs 83 extending from the mount 12. The overtravel stop 79 is generally defined by a vertical wall that limits rotation of the mount 12 relative to the windscreen button 20.

With reference again to FIGS. 1A-3, the mount 12 includes an engagement area 80 configured to receive the attachment clip 30 which may be a spring clip constructed from a metallic material such as springsteel. The engagement area 80 also includes internal abutment walls 81 extending upwardly from the engagement area 80 and which may abut the windscreen button 20 during connection with the windscreen button 20. The mount 12 also includes inner alignment features 82 configured to properly align and maintain the position of the attachment clip 30 during and after installation. The inner alignment features 82 align the central portion 32 of the attachment clip 30. Peripheral alignment features 84, which are generally defined by the recesses 16, 18, are configured to align the first and second opposing loading members 34, 36 of the attachment clip 30 properly on the mount 12. In addition, a receiving aperture 86 is disposed in the engagement area 80, and is configured to receive a mechanical fastener 88.

With reference yet again to FIGS. 1A-3, the central portion 32 of the attachment clip 30 is configured for abutting engagement with the engagement area 80 of the mount 12. The attachment clip 30 includes a fastener aperture 90 configured to receive the mechanical fastener 88 during installation. Prior to engagement of the attachment clip 30 with the mount 12, the central portion 32 and the first and second opposing loading members 34, 36 are generally aligned and planar in configuration. The central portion 32 is also generally wider than the first and second opposing loading members 34, 36. Notably, each of the flex portions 38, 40 are configured to abut against the periphery 14 of the mount 12 at each of the first and second recesses 16, 18, respectively, during installation. As noted herein, the recesses 16, 18 generally define the peripheral alignment features 84 configured to align the attachment clip 30 on the mount 12.

Figure 5:
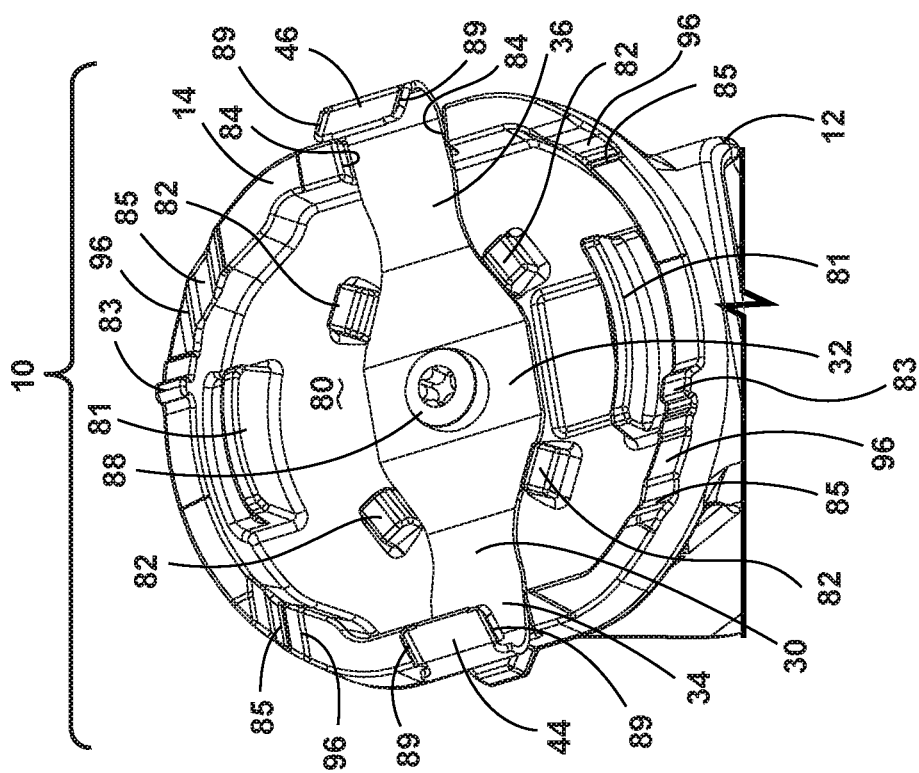
FIG. 5 is a top rear perspective view of a rearview mounting assembly of the present disclosure.
Figure 4:
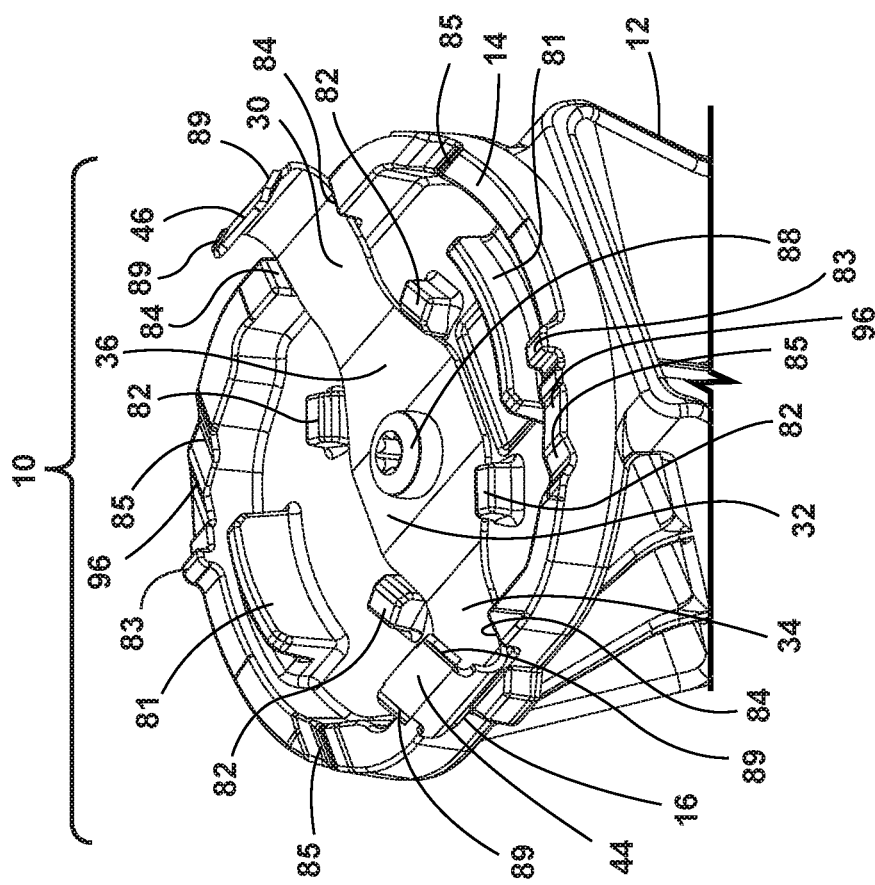
FIG. 4 is a top perspective view of a rearview mounting assembly of the present disclosure.

With reference now to FIGS. 4 and 5, the attachment clip 30 is secured to the mount 12 and pre-loaded as explained herein. The connection portions 44, 46 extend upwardly, away from the mount 12 and are configured to engage with the windscreen button 20. The attachment clip 30 includes a generally symmetrical construction and also upturned flanges 89 on each side of the connection portion 44 and the connection portion 46. The upturned flanges 89 assist in transitioning the connection portions 44, 46 onto the engagement surfaces 22, 24. The central portion 32 is aligned with the inner alignment features 82 and the connection portions 44, 46 are positioned with the first and second recesses 16, 18.

Figure 6:
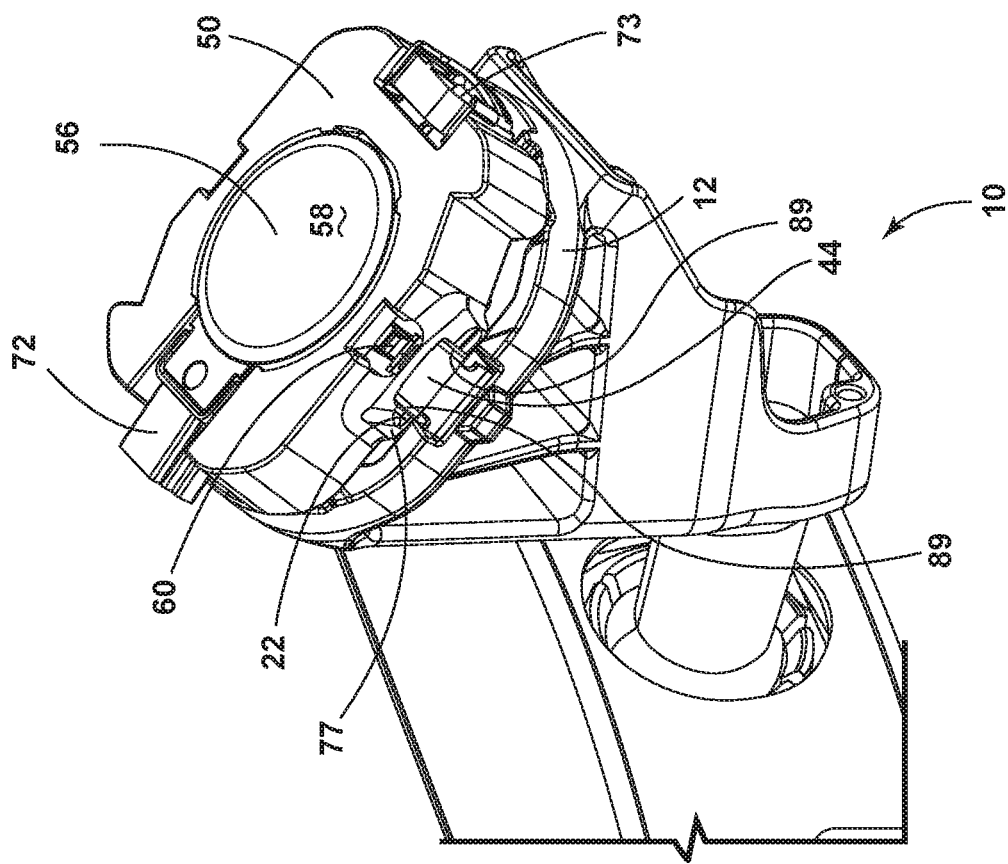
FIG. 6 is a top perspective view of a rearview mounting assembly of the present disclosure prior to coupling the windscreen button with the mount.
Figure 7:
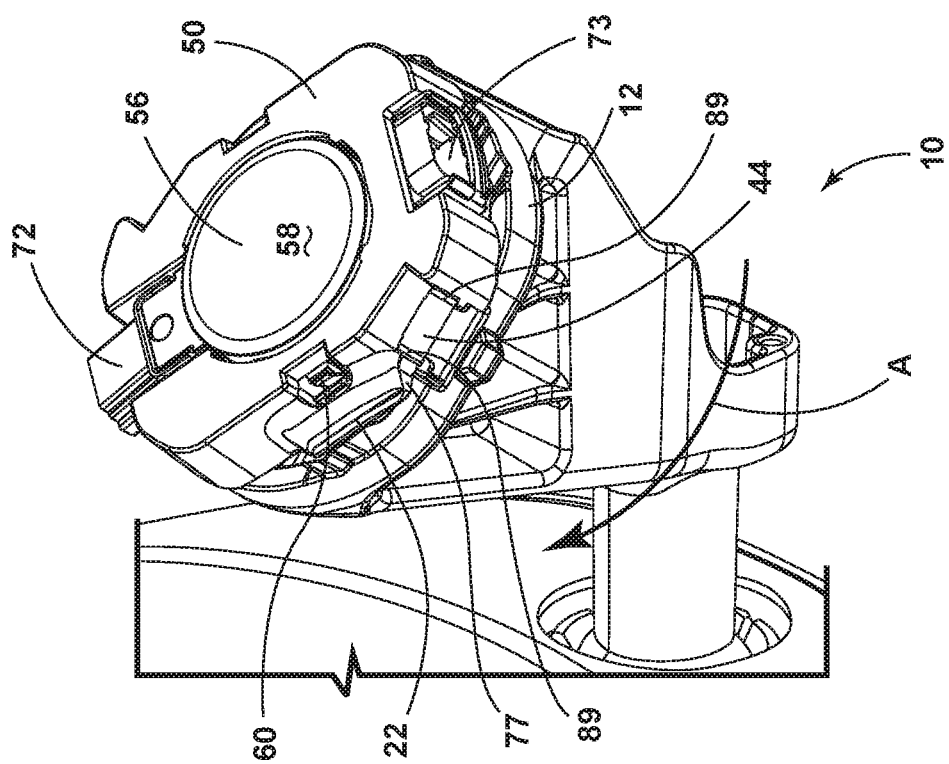
FIG. 7 is a top perspective view of the rearview mounting assembly of FIG. 6 after coupling the windscreen button with the mount.

As shown in the exemplary construction of FIGS. 6 and 7, after the sensor 56 is positioned within the opening 54 of the windscreen button 20, the retention features 60 are engaged with the attachment portions 68, thus securing the sensor 56 within the opening 54. The mount 12 is then aligned with the windscreen button 20 such that the connection portions 44, 46 are adjacent the ramps 77 of each of the engagement surfaces 22, 24, respectively (FIG. 6). The mount 12 is then rotated in the direction of Arrow A such that the connection portions 44, 46 abut the engagement surfaces 22, 24. The mount 12 is rotated until the locating features 76 are nested within the locating troughs 85 and the overtravel stops 79 abut the ribs 83.

With reference now to FIGS. 2-5, 8, and 9, the mount 12 includes approximately 45 degree angled locating surfaces that define each of the locating trough 85 and that engage the locating features 76 on the windscreen button 20. The locating troughs 85, together with the locating features 76, provide a two-way locator to help notify the installer that the mount 12 has been fully installed onto the windscreen button 20 and restricts side to side movement of the rearview device attachment assembly 10. Further, the mount 12 includes lead-in ramps 96 that help provide a smooth and easy rotation during installation of the mount 12 onto the windscreen button 20. The mount 12 also includes an overtravel rib 83 configured to engage the overtravel stop 79 on the windscreen button 20 that prevents over-rotation of the mount 12 into the windscreen button 20.

During installation, the windscreen button 20 can be coupled with the mount 12 by way of the attachment clip 30. The attachment clip 30 is configured to be attached to the mount 12 by the mechanical fastener 88 that extends through the fastener aperture 90 defined in the central portion 32 of the attachment clip 30. During fastening of the mechanical fastener 88 to the receiving aperture 86 in the mount 12, the attachment clip 30 becomes pre-loaded. More specifically, as the central portion 32 of the attachment clip 30 is drawn down into contact with the engagement area 80 of the mount 12, the first and second opposing loading members 34, 36 are prevented from lowering, and as a result, a pre-loading condition occurs. It is also contemplated that the pre-load may be changed by changing features of the recesses 16, 18. More specifically, the pre-load could be changed by the depth of the recesses 16, 18, resulting in in higher or lower deflection of the first and second opposing loading members 34, 36. As previously noted, the central portion 32 and the first and second opposing loading members 34, 36 of the attachment clip 30 are generally aligned and planar prior to loading (FIG. 1A), but the central portion 32 is lowered relative to the first and second opposing loading members 34, 36 after the pre-loading condition occurs (FIGS. 4 and 5), thereby creating an arched configuration. Once the central portion 32 of the attachment clip 30 is secured with the engagement area 80 of the mount 12, the windscreen button 20 can then be positioned adjacent to the mount 12 (FIG. 7), and the mount 12 can be rotated against the windscreen button 20, such that the connection portions 44, 46 of the attachment clip 30 slide against the engagement surfaces 22, 24 of the windscreen button 20 (FIG. 6). The connection portions 44, 46 are slid into engagement with the engagement surfaces 22, 24, respectively, of the windscreen button 20 until the locating troughs 85 of the mount 12 engage the locating features 76 of the windscreen button 20.

This construction provides a reduced windscreen packaging space, thereby minimizing the overall space required by the rearview device attachment assembly 10. The attachment clip 30 is configured to complement the windscreen button 20, which is configured to package around the sensor 56, thereby providing additional space on the windscreen of the vehicle. Because the attachment clip 30 is pre-loaded after attachment to the mount 12, the attachment clip 30 includes a lower stiffness that allows for easier install compared to traditional designs. In addition, because of this construction, the attachment clip 30 does not plastically deform during install or detachment. Accordingly, serviceability of the rearview device attachment assembly 10 is improved. Moreover, the lower stiffness and the two-lobe configuration of the attachment clip 30, the locating features 76, the locating troughs 85, and the lead-in ramps 96 allow for more favorable head impact testing and head form testing. The attachment clip 30 also has reduced susceptibility to tolerance variation due to low spring constant and high deflection install. As a result, minor variations in the spring and mount dimensions have negligible impact on the installation torque. This construction is very resistant to inadvertent detachment due to the large footprint of the mount 12 and the locating features 76 of the windscreen button 20, as well as the adequate retention of the attachment clip 30. Moreover, the installation torque does not degrade as can happen with traditional attachment clips.

The low spring constant of the two-lobe spring and the pre-loading that occurs reduces the amount of additional spring deflection that is required to install the rearview device attachment assembly 10. However, there is also a higher resistance to inadvertent detach during movement or manipulation of the rearview device attachment assembly 10. The retention features 60 that are spread about the windscreen button 20 also provide for a more robust attachment compared to traditional mounting systems. During install, the mount 12 is generally rotated 30 degrees, as compared to 60 degrees for traditional designs. This lessened degree of rotation minimizes the required space needed to rotate the rearview device attachment assembly 10 into secure connection with the windscreen button 20. Overall, the optimized attachment clip design, as set forth herein, allows for a rearview mounting assembly to be installed and detached multiple times without risk of plastic deformation to the attachment clip.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A rearview device attachment assembly comprising:
a mount including an edge around the periphery of mount that defines first and second recesses, the mount engages a windshield button; and
an attachment clip coupled to the mount at a central portion of the attachment clip, the attachment clip including:
first and second opposing loading members that abut the first and second recesses;
a flex portion extending from each of the first and second opposing loading members; and
a connection portion extending inwardly from each of top of the flex portions, wherein each of the first and second loading members of the attachment clip is pre-loaded during coupling of the attachment clip to the mount, but prior to rotational engagement of the attachment clip with engagement surfaces of the windshield button;
wherein the pre-loading of the first and second loading members of the attachment clip comprises creating an arched configuration with the attachment clip, with the central portion of the attachment clip disposed toward an engagement area of the mount while a portion of each of the first and second loading members are supported in the first and second recesses.

2. The rearview device attachment assembly of claim 1, wherein an engagement area of the mount includes inner alignment features configured to align the attachment clip on the mount.

3. The rearview device attachment assembly of claim 2, wherein the inner alignment features extend about a central portion of the attachment clip.

4. The rearview device attachment assembly of claim 1, wherein the first and second recesses define peripheral alignment features configured to align the attachment clip on the mount.

5. The rearview device attachment assembly of claim 1, further comprising:
locating features that include protrusions that extend outwardly from the windshield button.

6. The rearview device attachment assembly of claim 5, wherein the locating features provide sensory feedback that the mount is fully engaged with the windshield button.

7. The rearview device attachment assembly of claim 1, wherein the windshield button includes a vertical wall defining a stop that limits rotation of the mount relative to the windshield button.

8. The rearview device attachment assembly of claim 7, further comprising: a ramp that provides smooth rotation during installation of the mount.

9. The rearview device attachment assembly of claim 1, further comprising:
locating features that provide tactile feedback indicating that the mount has been fully secured to the windshield button.

10. The rearview device attachment assembly of claim 9, wherein the mount includes locating troughs that engage the locating features of the windshield button.

11. The rearview device attachment assembly of claim 1, wherein the attachment clip includes upturned flanges that assist in transitioning the connection portions onto the engagement surfaces.

12. The rearview device attachment assembly of claim 1, wherein a sensor is positioned within an opening of the windshield button.

13. The rearview device attachment assembly of claim 12, further comprising:
a sensor clip that retains the sensor to the windshield button.

14. The rearview device attachment assembly of claim 1, further comprising:
internal abutment walls disposed on the mount.

* * * * *